United States Patent
Bosch et al.

(10) Patent No.: US 9,374,297 B2
(45) Date of Patent: Jun. 21, 2016

(54) METHOD FOR IMPLICIT SESSION ROUTING

(71) Applicant: CISCO TECHNOLOGY, INC., San Jose, CA (US)

(72) Inventors: Hendrikus G. P. Bosch, Aalsmeer (NL); James N. Guichard, New Boston, NH (US); David D. Ward, Los Gatos, CA (US); Alessandro Duminuco, Vibonati (IT); Rex E. Fernando, Dublin, CA (US); Paul Quinn, Wellesley, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 70 days.

(21) Appl. No.: 14/108,994

(22) Filed: Dec. 17, 2013

(65) Prior Publication Data

US 2015/0172170 A1     Jun. 18, 2015

(51) Int. Cl.
| | |
|---|---|
| *G06F 15/173* | (2006.01) |
| *H04L 12/733* | (2013.01) |
| *H04L 12/707* | (2013.01) |
| *H04L 12/713* | (2013.01) |
| *H04L 12/715* | (2013.01) |
| *H04L 12/703* | (2013.01) |

(52) U.S. Cl.
CPC ............... *H04L 45/20* (2013.01); *H04L 45/24* (2013.01); *H04L 45/04* (2013.01); *H04L 45/28* (2013.01); *H04L 45/586* (2013.01)

(58) Field of Classification Search
CPC .................... H04L 29/08144; H04L 29/12009
USPC ........................................................ 709/238
See application file for complete search history.

(56) References Cited

U.S. PATENT DOCUMENTS

| | | | | |
|---|---|---|---|---|
| 6,167,438 | A * | 12/2000 | Yates | ................ G06F 17/30902 707/E17.12 |
| 7,197,660 | B1 | 3/2007 | Liu et al. | |
| 7,209,435 | B1 * | 4/2007 | Kuo | ....................... H04L 45/00 370/219 |
| 7,231,462 | B2 | 6/2007 | Bethaud et al. | |
| 7,558,261 | B2 | 7/2009 | Arregoces et al. | |
| 7,567,504 | B2 * | 7/2009 | Darling | .................. H04L 29/06 370/216 |
| 7,571,470 | B2 | 8/2009 | Arregoces et al. | |

(Continued)

FOREIGN PATENT DOCUMENTS

| | | |
|---|---|---|
| CN | 104011687 A | 8/2014 |
| EP | 2791802 | 6/2013 |
| WO | WO2005/104650 | 11/2005 |
| WO | WO2013/090035 | 6/2013 |
| WO | WO2014/189670 | 11/2014 |
| WO | WO2015/094567 | 6/2015 |

OTHER PUBLICATIONS

PCT Jun. 26, 2014 International Preliminary Report on Patentability from International Application PCT/US2012/067502.

(Continued)

*Primary Examiner* — Vivek Srivastava
*Assistant Examiner* — Atta Khan
(74) *Attorney, Agent, or Firm* — Patent Capital Group (57) ABSTRACT

An example method is provided in one example embodiment and includes receiving a packet of a session from a previous hop router at a service zone of a service chain; recording the previous hop router for the session; determining an appliance to service the packet in the service zone using load balancing; recording an appliance identity for servicing the session in the service zone; determining a next hop router in the service chain for the packet using load balancing; and recording the next hop router for the session.

19 Claims, 6 Drawing Sheets

(56) References Cited

U.S. PATENT DOCUMENTS

| | | | |
|---|---|---|---|
| 7,610,375 B2 | 10/2009 | Portolani et al. | |
| 7,643,468 B1* | 1/2010 | Arregoces | H04L 12/462 370/351 |
| 7,647,422 B2* | 1/2010 | Singh | H04L 12/4641 370/351 |
| 7,657,940 B2 | 2/2010 | Portolani et al. | |
| 7,668,116 B2* | 2/2010 | Wijnands | H04L 45/02 370/254 |
| 7,860,095 B2* | 12/2010 | Forissier | H04L 47/10 370/385 |
| 7,990,847 B1* | 8/2011 | Leroy | H04L 43/0817 370/216 |
| 8,291,108 B2* | 10/2012 | Raja | G06F 9/505 709/225 |
| 8,311,045 B2 | 11/2012 | Quinn et al. | |
| 8,442,043 B2 | 5/2013 | Sharma et al. | |
| 8,762,534 B1* | 6/2014 | Hong | G06F 9/505 370/389 |
| 8,904,037 B2* | 12/2014 | Haggar | H04L 29/12009 370/351 |
| 9,088,584 B2 | 7/2015 | Feng et al. | |
| 2001/0023442 A1* | 9/2001 | Masters | H04L 67/1008 709/227 |
| 2002/0131362 A1* | 9/2002 | Callon | G06F 11/2294 370/216 |
| 2003/0088698 A1 | 5/2003 | Singh et al. | |
| 2003/0120816 A1 | 6/2003 | Berthaud et al. | |
| 2004/0264481 A1 | 12/2004 | Darling et al. | |
| 2004/0268357 A1 | 12/2004 | Joy et al. | |
| 2005/0257002 A1 | 11/2005 | Nguyen | |
| 2006/0092950 A1 | 5/2006 | Arregoces et al. | |
| 2006/0095960 A1 | 5/2006 | Arregoces et al. | |
| 2006/0233106 A1* | 10/2006 | Achlioptas | H04L 45/745 370/235 |
| 2006/0233155 A1* | 10/2006 | Srivastava | H04L 45/00 370/351 |
| 2007/0250836 A1 | 10/2007 | Li et al. | |
| 2008/0177896 A1 | 7/2008 | Quinn et al. | |
| 2008/0225710 A1 | 9/2008 | Raja et al. | |
| 2009/0300407 A1 | 12/2009 | Kamath et al. | |
| 2009/0328054 A1 | 12/2009 | Paramasivam et al. | |
| 2010/0165985 A1 | 7/2010 | Sharma et al. | |
| 2012/0030365 A1* | 2/2012 | Lidstrom | H04L 67/322 709/228 |
| 2013/0097323 A1* | 4/2013 | Barsness | G06F 9/5033 709/226 |
| 2013/0163594 A1 | 6/2013 | Sharma et al. | |
| 2013/0198412 A1* | 8/2013 | Saito | H04L 29/12009 709/245 |
| 2013/0279503 A1* | 10/2013 | Chiabaut | H04L 445/24 370/389 |
| 2014/0188676 A1* | 7/2014 | Marmolejo-Meillon | H04L 41/0809 705/34 |
| 2014/0304412 A1* | 10/2014 | Prakash | H04L 61/1511 709/226 |
| 2014/0351452 A1 | 11/2014 | Bosch et al. | |
| 2014/0379938 A1 | 12/2014 | Bosch et al. | |

OTHER PUBLICATIONS

USPTO Jul. 10, 2014 Non-Final Office Action from U.S. Appl. No. 13/329,023.
USPTO Nov. 5, 2014 Notice of Allowance from U.S. Appl. No. 13/329,023.
Fernando et al., "Virtual Topologies for Service Chaining in BGP IP VPNs; draft-rfernando-l3vpn-service-chaining-01," Internet Engineering Task Force, Feb. 25, 2013; 16 pages.
Fang et al., "BGP IP BPN Virtual PE; draft-fang-13vpn-virtual-pe-02," Internet Engineering Task Force, Apr. 7, 2013; 26 pages.
PCT Nov. 10, 2014 International Search Report from International Application No. PCT/US2014/036907; 3 pages.
Rosen et al., "BGP/MPLS IP Virtual Private Networks (VPNs)," Network Working Group, RFC 4364, Feb. 2006; 47 pages.
USPTO Mar. 25, 2015 Notice of Allowance from U.S. Appl. No. 13/329,023.
Bitar, et al., "Interface to the Routing System (I2RS) for Service Chaining: Use Cases and Requirements," draft-bitar-i2rs-service-chaining-00.txt; Internet Engineering Task Force, IETF Standard Working Draft; Jul. 15, 2013; 30 pages.
Mackie, B., et al., "Service Function Chains Using Virtual Networking," draft-mackie-sfc-using-virtual-networking-o2.txt; Internet Engineering Task Force, IETF Standard Working Draft, Oct. 17, 2013; 44 pages.
PCT Mar. 16, 2015 International Search Report and Written Opinion from International Application No. PCT/US2014/066629.
U.S. Appl. No. 13/329,023, filed Dec. 16, 2011, entitled "System and Method for Non-Disruptive Management of Servers in a Network Environment," Inventors: Chao Feng, et al.
U.S. Appl. No. 13/923,257, filed Jun. 20, 2013, entitled "Hierarchical Load Balancing in a Network Environment," Inventors: Hendrikus G. P. Bosch, et al.
PCT-Apr. 4, 2013 International Search Report and Written Opinion from International Application No. PCT/US2012/067502 11 pages.
Ip infusion™, "A Redundant Architecture for Routing Protocols," White Paper, Jun. 2002, XP002240009, 8 pages; www.ipinfusion.com/pdf/WP_Redundancy_rev0602.pdf.
PCT-Jun. 6, 2008 International Search Report and Written Opinion from International Application No. PCT/IB05/01013, 5 pages.
PCT Mar. 10, 2009 International Preliminary Report on Patentability from International Application No. PCT/IB05/01013, 5 pages.
Bosch, et al., "Telco Clouds and Virtual Telco: Consolidation, Convergence, and Beyond", May 23-27, 2011, Proceedings of 2011 IFIP/IEEE International Symposium on Integrated Network Management (IM), Dublin, 7 pages.
Kim, et al., "Floodless in Seattle: A Scalable Ethernet Architecture for Large Enterprises," Computer Communication Review, Oct. 2008, 14 pages; http://www.cs.princeton.edu/~chkim/Research/SEATTLE/seattle.pdf.
Rescorla, "Introduction to Distributed Hash Tables," Proceedings of the sixty-seventh Internet Engineering Task Force, IAB Plenary, Nov. 5-10, 2006, San Diego, CA, 39 pages; http://www.ietf.org/proceedings/65/slides/plenaryt-2.pdf.
Wu, et al., "Resilient and efficient load balancing in distributed hash tables," Journal of Network and Computer Applications 32 (2009), 16 pages; http://sist.sysu.edu.cnt~dwu/papers/jnca09-lb.pdf.
Lampson, "How to Build a Highly Available System Using Consensus," Proceedings of the 10th International Workshop on Distributed Algorithms (1996), 17 pages; http://research.microsoft.com/en-us/um/people/blampson/58-Consensus/Acrobat.pdf.
Gray, et al., "Leases: An Efficient Fault-Tolerant Mechanism for Distributed File Cache Consistency," Proceedings of the twelfth ACM symposium on Operating systems principles, New York, NY (1989), 9 pages; http://www.stanford.edu/class/cs240/readings/89-leases.pdf.
Jeff Pang, Distributed Hash Tables< 2004, 33 pages; http://www.cs.cmu.edu/~dga/15-744/S07/lectures/16-dht.pdf.

* cited by examiner

METHOD FOR IMPLICIT SESSION ROUTING

TECHNICAL FIELD

This disclosure relates in general to data networks and more particularly, to a method, a system, and an apparatus for implicit session routing in a chain of services.

BACKGROUND

In a service routed network a network of service routers maintain aggregate routing information for inter-service-zone communication. These service routers exchange route prefixes and service router information to allow service routers to forward packets between a series of service zones. The service routers may be virtual, with each zone being supported by one or more appliances hosted on a virtual machine that provides the actual service. The service routers function as a bridge between inter-zonal communication and packet routing/switching through the appliance. An exemplary virtual service zone router executes in a virtual machine, however as an alternative, physical service zone routers may also be implemented. All service zones, their appliances, the virtual service routers and the routing of packets between the zones are called the service chain architecture.

Service chaining may be defined in terms of virtual routing and forwarding (VRF) and session routing and forwarding (SRF) functions. The VRFs are used for maintaining inter-zonal connectivity between service zones and list aggregate routes and the associated tunneling mechanisms for a service type, while the SRFs list which sessions (i.e., 5-tuple-flow) are served by what appliance in the zone. If a processing entity (e.g. data center blade) hosts multiple service types, an equal number of VRF/SRF combinations are available on the service router. The above-mentioned methods maintain VRF adjacency and the appliance session routes in SRFs, but fail to provide mechanisms for managing session state in SRFs.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method, system and apparatus for providing implicit session management in a service chain in a network are disclosed. In the method, system and apparatus, mechanical load balancing of sessions is applied at appropriate points in the service chain to route a first packet of a session through the service chain. Once the packet has been routed though each zone of the entire service chain, independent virtual routing functions and virtual service functions (VRF/SRFs) in each of the service zones for the session have recorded the previous hop, serving appliance and next hop for that particular session and subsequent packets in the session traffic flow follow the same path. The method, system and apparatus may be used to implement mechanisms that address addition, removal, changes, and failures in the configuration of appliances and service routers in the service chain.

In one example embodiment, a first session packet is received from a virtual routing function (VRF(y)) of previous hop router at a virtual routing function VRF(x) of a service router (current hop router) in a service zone x of a service chain. VRF(x) records the VRF(y) as the previous hop router for the session. A service routing function (SRF(x)) of the current hop service router then determines an appliance in the service zone x to service the packet by applying a load balancing function. The identity of the appliance is recorded in SRF(x) of the current hop router and the session packet is sent to the appliance and serviced. VFR(x) determines a next hop virtual routing function VRF(z) of a next hop router for which to send the packet to out of available VRFs in the next service zone z by applying a load balancing function in VRF(x). VRF(x) then records VRF(z) as next hop router for the session and forwards the packet to VRF(z). The process may then be repeated in zone z and subsequent service zones in the service chain. Once a session packet has been routed though each zone of the entire service chain, each independent VRF/SRF in each of the service zones for the session has recorded the previous hop, serving appliance and next hop for that particular session. These session routing entries record the path session packets will follow for the session. The load balancing functions used at the various points in the service chain may be the same or different functions.

EXAMPLE EMBODIMENTS

The method and apparatus will now be described by use of exemplary embodiments. The exemplary embodiments are presented in this disclosure for illustrative purposes, and not intended to be restrictive or limiting on the scope of the disclosure or the claims presented herein.

The example embodiments disclose automated techniques implemented to route sessions through a series of services managed by service zones, and associated appliances without requiring explicit signaling between service routing functions (SRFs) of the service zones by routing mechanically, i.e., by way of a function. No signaling is needed to inform the service routers and their SRFs of which appliance serves what session. Sessions are load balanced mechanically over the available appliances through the service chain. Previous load-balancing decisions are cached and maintained in a session-routing table maintained for each service router. Additional signaling is only required for recovering lost session-routing state upon failure of a session router and a minimal amount of signaling is required to identify new appliances in a service zone.

The embodiments provide an advantage over other methods for managing session state. For example, one known implementation for maintaining SRF session state is performed by explicit distribution of session-routing state information between all SRFs in a service zone when a new session appears in the system. Such an implementation may require explicitly signaling all SRF instances in a service zone whenever a SRF receives a transmission control protocol (TCP) SYN packet indicative of a new TCP session in the service zone. Similarly, at the end of a session, reception of a TCP FIN packet creates additional signaling to inform all SRFs in the service zone the session is terminated.

This disclosure presents embodiments that implement a completely decentralized session-routing and service chaining system. As compared to, for example, using a central controller to map session routes through a series of service routers, decentralized local decision making provides the advantage of not requiring central entities. A central entity or controller may suffer from signaling overload and create a single point of failure.

Figure 1:
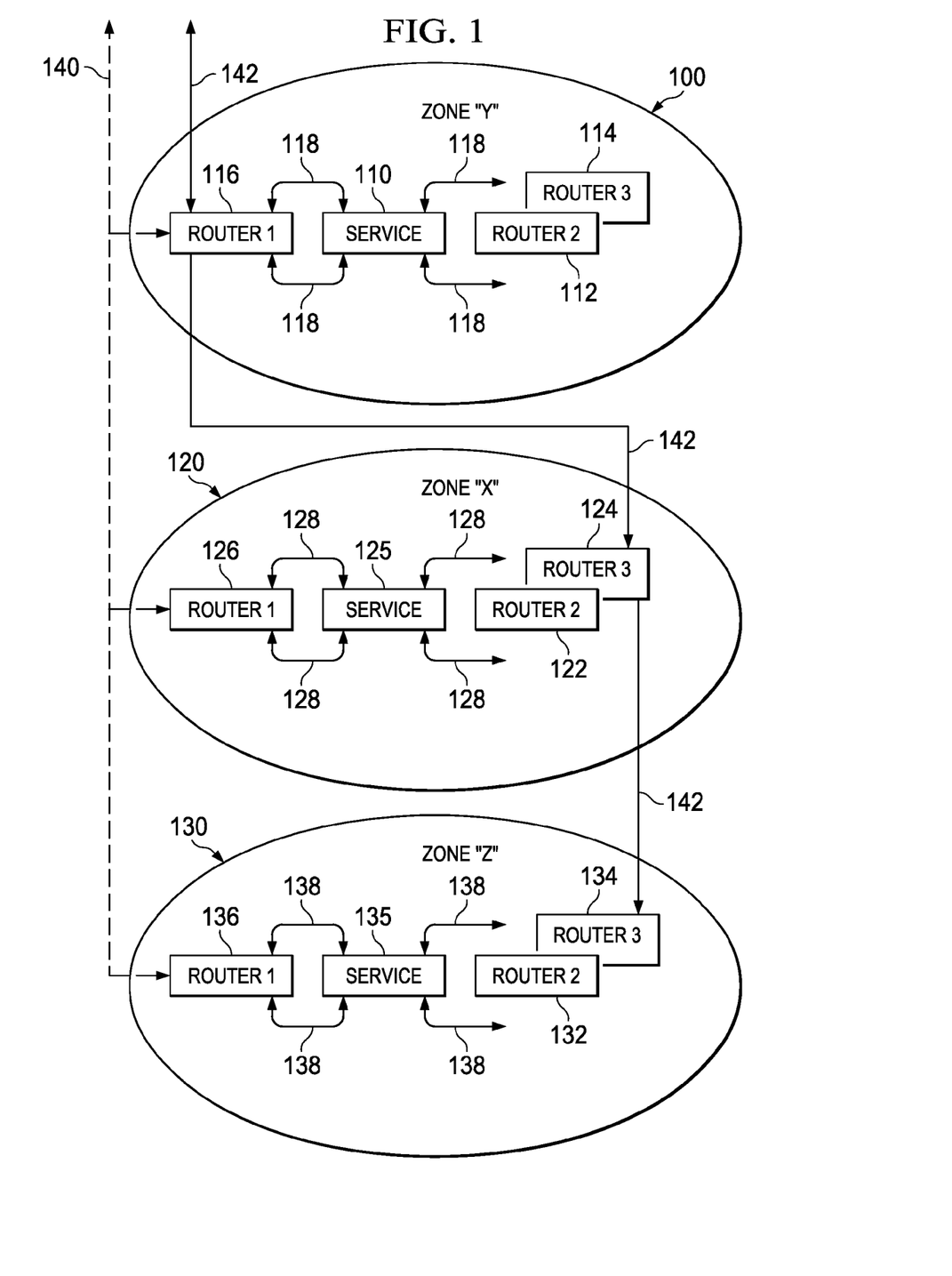
FIG. 1 is a simplified block diagram illustrating a service chain in a network according to an example embodiment of the disclosure.

Reference is now made to FIG. 1, FIG. 1 illustrates an example architecture for a service chain that may be of arbitrary length. FIG. 1 shows a service chain that includes service zones 100, 120 and 130, also denoted Zone "y", Zone "x" and Zone "z", respectively. A service zone is a logical construct, not a physical construct. Service zone y 100 includes an in-line application service 110, service zone x 120 includes in-line application service 125, and service zone z 130 includes in-line application service 135. For example, service 110 may be a firewall and each of services 125 and 135 may be a Hypertext Transport Protocol (HTTP) service, a Deep Packet Inspection (DPI) function, TCP optimizer, etc. Moreover, there may be multiple instances of the same service in each zone. For example, there may be multiple instances of the same service 110 in zone y 100, multiple instances of the same service 125 in zone x 120 and multiple instances of service 135 in zone z 130. Further, these services 110, 125 and 135 may be virtual machines running on an appliance in a data center. The appliance may be implemented as any type of hardware/software that services a session by processing session packets according to the service. There may be hundreds of instances of the same service running in a given service zone.

As an example, there are a plurality of routers 112, 114 and 116 in zone y 100 and a plurality of routers 122, 124 and 126 in zone x 120. Routers in a given service zone connect to a service by way of attachment circuits shown at reference numerals 118, 128 and 138 in service zones y 100 and x 120 and z 130, respectively. The routers shown in FIG. 1 may be configured to force traffic through a service (or service instance) in their respective service zone. There may be a plurality of tunnels and signaling connections between the routers of the various zones of FIG. 2. Traffic from a router in one service zone may be routed to any of several routers in another service zone. For example, reference numeral 142 shows a data channel through MPLS tunnels between routers of the service zones. Although the term 'router' is illustrated and used in the example configuration of FIG. 1, 'router' as used in this disclosure is meant to include any type of network node or switching equipment that may perform the functions for implicit routing as disclosed herein.

In the embodiment of FIG. 1, and using the example of data channel 142, the router 116 receives traffic from another service zone (logically above service 100 but not shown in FIG. 1), forces the traffic through the service 110 (or one of several instances of service 110), and then forwards the traffic, after processing by the service 110, along tunnel 142 to router 124 in service zone x 120. Similarly, router 124 in service zone x 120 receives the traffic from router 116 via tunnel 142, forces it to service 125 (or one of several instances of service 125), and then forwards the traffic on to router 134 in service zone z 130. The same flow may occur in the opposite direct for inbound traffic to service zone z 130 to service zone x 120 to service zone y 100 and then onward to another service zone or destination Although the example of FIG. 1 shows data channel 142 as between particular routers, traffic from a router in one service zone may be routed to any of several routers in another service zone. For example, router 116 may elect to forward traffic through a data channel to router 126 in service zone x 120 rather than router 124, and router 126 may elect to forward traffic through a data channel to router 132 of service zone z, etc. In those scenarios data channel 142 would be shown as from router 116 to router 126 and then to router 132. State (adjacency information) is replicated appropriately between the routers within the service zone and between routers in different service zones, or a reconciliation protocol exist to resolve mappings. In the example embodiments, the decisions made in each router of a service zone as to which router of the next service zone to forward traffic to is done by applying a load balancing function. This may be a function, for example, such as an equal cost multipath (ECMP) algorithm.

Each service zone is assigned a route target. Again, a route target is assigned to a unique service zone to serve as a community value for route import and export between routers via a control protocol. A chain of services is created by appropriate import and export of destination network prefixes by way of route targets at routers of the service zones. Zone y 100 imports route targets from Zone x 120 and likewise, Zone x 120 imports route targets from Zone y 100 for the return/default path. Zone x 120 imports route targets from Zone z 130 and likewise, Zone z 130 imports route targets from Zone x 120 for the return/default path. Each of the routers shown in FIG. 1 is equipped with the appropriate service zone route targets and imports and exports the appropriate addresses. This involves receiving from a next service zone, a set of addresses, changing the service zone route targets to its own service zone export route target and re-originating those addresses for the previous service zone so that a chain is built up. All of the signaling necessary to achieve this may be performed by a control protocol, such as BGP or any other Internet Gateway Protocol. Advertisements between routers in service zones are sent in a direction opposite to traffic flow between service zones. For example, if traffic flows from a first service zone that is upstream from a second service zone, then route advertisements may be sent from the second service zone to the first service zone. Each of the routers in a zone maintains virtual routing and forwarding (VRF) functions for inter-service-zone traffic and a service routing and forwarding (SRF) function to direct packets within the service zone to the appropriate service instance. SRFs maintains the mappings between the service instances and the application sessions, while VRFs are linked by way of IP-in-IP or MPLS tunnels to subsequent routers, and maintain the attachment circuits to service instances. In the embodiments of the disclosure both the SRFs and VRFs maintain per session routing information. The SRFs maintain per-session routing information by storing service instance information for the sessions and the VRFs maintain per-session routing information by storing next hop and previous hop information for the sessions. An SRF and a VRF may be integrated into a single data structure.

Figure 2:
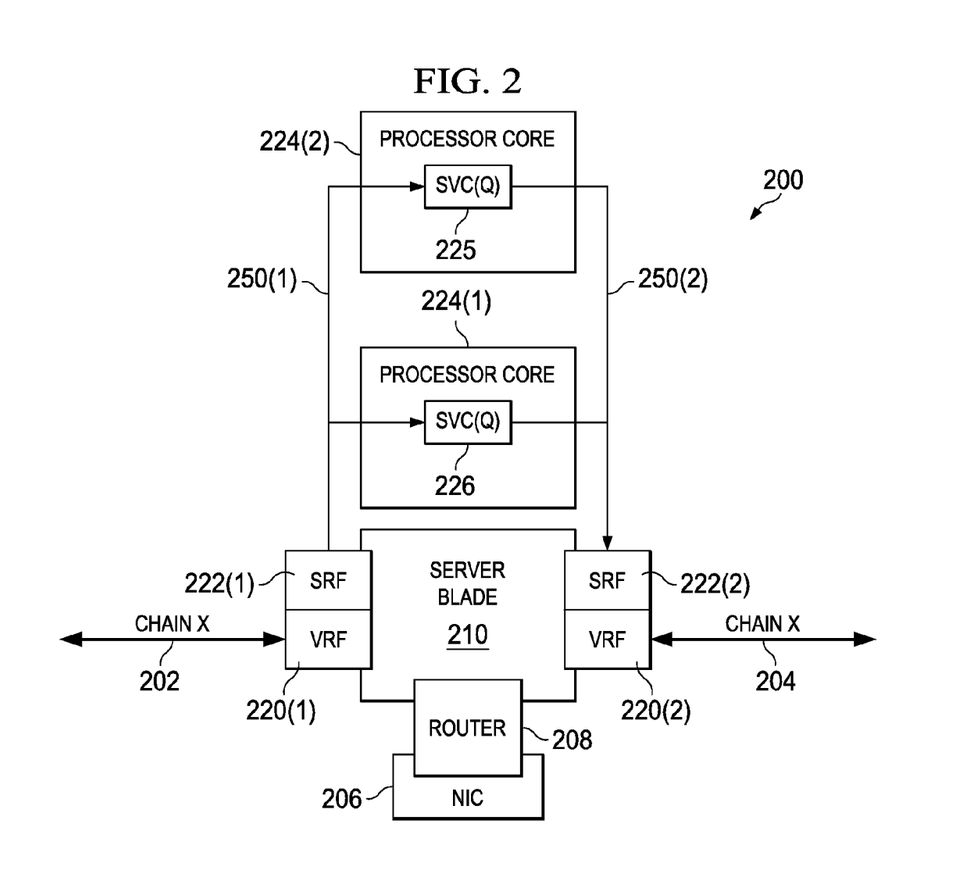
FIG. 2 is a simplified block diagram illustrating session routing and forwarding performed within a service zone in accordance with an example embodiment.

Referring now to FIG. 2, therein is a simplified block diagram illustrating session routing and forwarding performed within a service zone to manage implicit session routing in accordance with an example embodiment of the disclosure. Reference numeral 200 is a service zone, and the elements shown in FIG. 2 are elements of the service zone that may be implemented in a data center. The data center includes a plurality of server blades such as server blade 210 each having one or more processor cores and capable of running multiple virtual machines. A virtual router 208 runs in a virtual machine on server blade 210 and operates a network interface card (NIC) 206. The virtual router 208 is equivalent to the aforementioned service routers referred to in connection with FIG. 2. The server blade 210 also stores data structures for virtual routing functions VRF 220(1) and VRF 220 (2). In the example embodiment, there are individual processor cores 224(1)-224(2) in the data center that each runs a service in a virtual machine. There may be a service running per processor core. For example, processor core 224 (1) runs service 226 (also called SVC(Q)) and processor core 224(2) runs another instance of the same service 225. Service routing function SRF 222(1) is associated with VRF 220(1) and SRF 222(2) is associated with VRF 220(2). There are a plurality of attachment circuits connected between the services 225 and 226 and the SRFs/VRFs. For example, attachment circuit 250(1) connects traffic from VRF 220(1) and SRF 222(1) to SVC(Q) in processor cores 224(1) and 224(2). Attachment circuit 250(2) connects traffic (after processing by SVC(Q)) from SVC(Q) in processor cores 224(1) and 224(2) to SRF 222(2) and VRF 220(2). The server blade 210 stores a data structure for each of the VRFs and SRFs. Each VRF contains information as to how to switch a packet into a service. Moreover, the VRFs 220(1) and 220(2) are companion VRFs with respect to traffic flow in either direction through the service zone. While the virtual routing functions VRF 220(1) and 220(2) and service routing functions SRF 222(1) and 222(2) are shown separately as two functional blocks in FIG. 2, references to VRFs and SRFs in other parts of this disclosure, such as, for example, VRF(Y) when referring to service zone y, or VRF(Xn) and SRF(Xn) when referring to a VRF and SRF in service zone x, are meant to include functions performed by both functional blocks of FIG. 2.

It is to be understood that FIG. 2 shows a single service zone, but any given service zone may be part of a chain of other service zones. The virtual router 208 will receive, from a third party, over a tunnel (e.g., an MPLS tunnel) an IP packet encapsulated with a header. Inside the header is a label that refers to a particular VRF in the VRF data structure stored in the server blade 210. For example, consider a packet that arrives into the data center, via virtual router 208, associated with service Chain x into VRF 220(1). The VRF 220(1) inspects the IP address of the packet and forwards the packet to the appropriate service, e.g., SVC(Q). Information is stored to indicate which of the SVC(Q) instances (on processor core 224(1) or on processor core 224(2)) is serving the IP address for that packet. VRF 220(2) receives the packet after it has been processed by SVC(Q) and forwards it out the service zone as appropriate.

As VRF 220(2) learns over Chain x that it has reachability to a particular downstream network, two things can happen. First, the VRF 220(2) leaks that information to its companion VRF 220(1) which can then re-originate that network address. Second, within each of the SRFs, state is maintained as to how to route individual traffic flows, bi-directionally for the service chains. More generally information is stored indicating which service each SRF should forward traffic to base on the particular packet flow of traffic (e.g., IP address of the traffic session or packet session). This operation is referred to as session routing within a service zone. According to the example embodiments of the disclosure, the method of distributing session routing state is by way of implementing mechanical load balancing sessions over a series of SRFs in a zone.

As discussed in relation to FIGS. 1 and 2, in the service zone model of service chaining, a service zone may include one or more service routers, each equipped with a SRF to connect to the actual appliance hosted on a processing entity and having connectivity from previous service zones and to next service zones by way of service VRFs.

As an example of connectivity, and referring again to FIG. 1, if we support service zone X 120 by way of an appliance X(1) on blade B(1) connected by service router 126 hosting a VRF(X(1)) for general adjacency and SRF(X(1)) to maintain session routing information to appliance X(1), then service zone Y 100 that precedes service X holds a VRF(Y) that refers to VRF(X(1)). Moreover, if there is a second appliance x(2) in service zone X, hosted on blade B(2) through service router 124 with VRF(X(2)) and SRF(X(2)) and adjacent to service zone Y, VRF(Y) refers to both VRF(X(1)) and VRF(X(2)). It goes that there can be many VRF(Y) instances on independent service routers referring to VRFs in service zone X. To provide for mechanical and implicit session routing, the example embodiments of the disclosure enable a "previous" hop, in causing VRF(Y) to make a load balancing decision on how to route a new session. When VRF(Y) determines whether to send the first packet of a new session to VRF(X(1)) or VRF(X(2)), it applies a load balancing function (e.g. ECMP or other) on a first session packet, and the outcome of that function determines which path to follow. The load balancing may include any type of function or processing of data that causes all "next hop" appliances to be roughly equally loaded or has equal loading of the next hop appliances as a goal. In one implementation VRF(Y) may use external stimuli (such as loading parameters) to make such a load-balancing decision. In an alternative implementation the determination is made independent of external stimuli. The load-balancing function operates over the all "next hop" appliances to determine the appropriate routing function. To make certain the session router makes the same decision every time it receives a packet in that session flow, the function outcome is recorded in the VRF of the previous hop where the routing decision is made. This session routing entry records the path session packets follow for as long as the session exists.

Figure 4A:
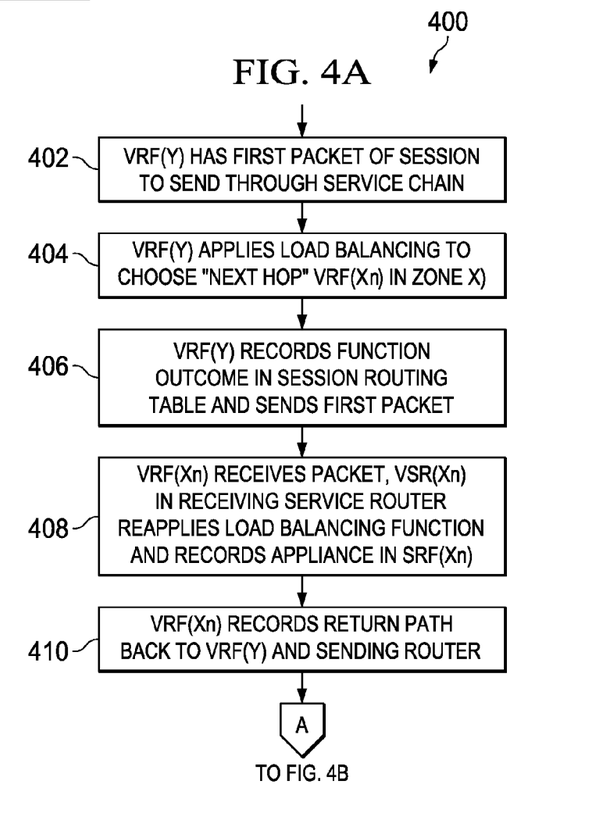
FIG. 4A is a flow diagram illustrating operations that may be associated with a process for implicit session routing in accordance with an example embodiment.
Figure 4B:
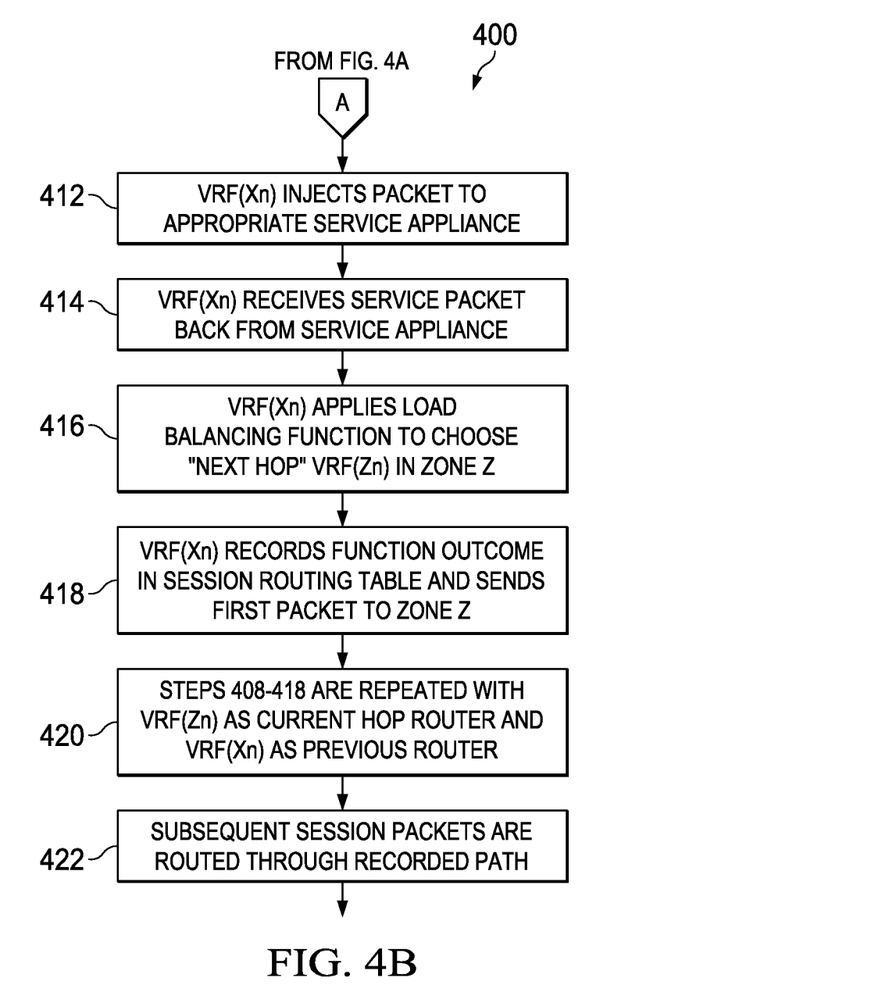
FIG. 4B is a flow diagram illustrating further operations that may be associated with a process for implicit session routing in accordance with an example embodiment.

Referring now to FIGS. 4A and 4B, therein are flow diagrams illustrating operations that may be associated with a process for implicit session routing in accordance with an example embodiment of the disclosure. FIGS. 4A and 4B will be described with reference to FIG. 1, and using an example scenario referring to particular routers and data channels of FIG. 1 for the routing of a session packet within a service chain. The example scenario used for the description is only one of many possible scenarios for routing a session packet in a service chain such as that shown in the example embodiment of FIG. 1 and the example scenario is presented for explanatory purposes only.

At 402 VRF(Y), which may be included in router 116, of service zone y has the first packet of a session to be sent through the service chain. At 404 VRF(Y) applies a load balancing function to determine the "next hop" router from the possible VRFs of the next zone, zone x, in the service chain. At 406 VRF(Y) performs recording of the function outcome, i.e., records the selected VRF(Xn) as the next hop router in its session routing table for the session. The term 'recording' as used in this disclosure may include any process of storing the appropriate information in any memory, etc., where it can be retained and accessed for later use. Once VRF(Y) has determined where to forward a packet, it sends the packet via the VRF-VRF tunnel on channel 142 to VRF (Xn), which in the example scenario of FIG. 1 may be included in next hop service router 124. At 408 VRF(Xn) receives the session packet re-applies the load balancing function to determine an appliance to service the session and records in the SRF(Xn) associated with VRF(Xn) which appliance serves the session. At 410 VRF(Xn) also records the return path for the session pointing back to VRF(Y) as the "previous hop" router in the previous service zone, zone y, that sent the session packet. It is important that forward and reverse paths are identical for some or all of the appliances as these appliances typically operate as man-in-the-middle and require all forward and reverse packets to operate appropriately. Next, referring to FIG. 4B and operation 412, the session packet is injected to the appropriate service appliance in zone x 120 by way of the appropriate attachment circuit of VRF(Xn) and at 414, VRF(Xn) receives the serviced packet back from the service appliance.

After the packet has been serviced at the appropriate service appliance, At 416 VRF(Xn) applies the load balancing function to determine the next hop VRF of the possible VRFs of zone z 130 to which the session packet may be routed in the service chain. At 418 VRF(Xn) records the function outcome, i.e. records VRF(Zn) as the next hop router in its session routing table for the session. Once VRF(Xn) has determined where to forward a packet, it sends the packet via the VRF-VRF tunnel on channel 142 to VRF(Zn), which in the example scenario of FIG. 1 is included in next hop service router 134.

At 420 operations 408-418 are repeated for service zone z 130 with VRF(Zn) and SRF(Zn) in place of VRF(Xn) as the current hop router and SRF(Xn), respectively, and VRF(Xn) in place of VRF(Y) as the previous hop router. If a service chain includes additional service zones beyond three service zones, as represented by service zones y, x and z, each service zone would repeat the process as the packets flow through the complete service chain. Once a session start packet is routed through the entire service chain, each independent VRF/SRF for the session in each zone has recorded the "next hop" and "previous hop" for that particular session. At 422 subsequent packets in the session are routed through the service chain through the recorded path.

Figure 3:
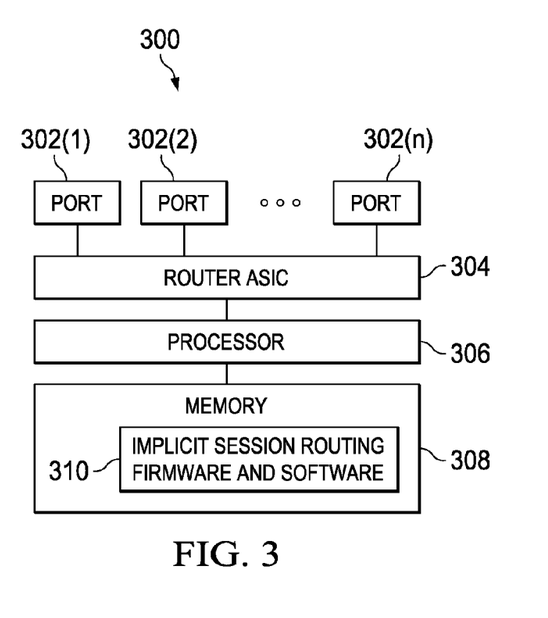
FIG. 3 is a simplified block diagram of a router in accordance with an example embodiment.

Referring now to FIG. 3, therein is an example block diagram is shown for a router configured to perform the operations described herein for a service router implementing VRF and SRF functions according to the example embodiments. Router 300 illustrates an example implementation of one or more of the routers shown in FIG. 1. It should be understood that a virtual router may be a software-emulated or virtualized version of what is shown in FIG. 3. The router, shown at reference numeral 300, comprises a plurality of ports 302(1)-302(n), a router Application Specific Integrated Circuit (ASIC) 304, a processor or central processing unit (CPU) 306 and memory 308. The ports 302(1)-302(n) receive ingress packets and output egress packets from the router. The router ASIC 304 directs incoming packets to ports for egress according to routing logic as well as controls from the processor 306. The processor 306 is a microprocessor or microcontroller, for example, and executes instructions included in the implicit session routing firmware/software 310 stored in memory 308. The implicit session routing firmware/software 310 includes instructions that, when executed by the processor 306, cause the processor to perform the operations described herein in connection with the implicit session routing, including the VRF and SRF functions, of the example embodiments of the disclosure.

The memory 308 may comprise read only memory (ROM), random access memory (RAM), magnetic disk storage media devices, optical storage media devices, flash memory devices, electrical, optical, or other physical/tangible memory storage devices. In general, the memory 308 may comprise one or more tangible (non-transitory) computer readable storage media (e.g., a memory device) encoded with software comprising computer executable instructions and when the software is executed (by the processor 306) it is operable to perform the operations described herein.

The implicit session routing of the embodiments requires much less session routing signaling in a service routed network relative to explicit session routing. For example, in the embodiments only configuration changes in the service chain may need to be signaled between the service routers. The rate at which configuration changes need to be signaled is minimal relative to the rate with which sessions are created and torn down and need to be signaled in explicit session routing.

When appliances are added to the mix of appliances of a service in a zone, it is not inconceivable that the mechanical function establishes sessions differently over the mix of appliances compared to its earlier distribution. By keeping record of earlier session routing decisions in the VRF/SRF tables, already established sessions are unaffected when new appliances are added to the system.

When appliances are removed two things happen. First, similar to when appliances are added to the mix, the mechanical function likely produces different mapping results. This can be dealt with similarly as when appliances are added to the system. Since sessions are explicitly recorded in VRFs and SRFs, ongoing sessions are not affected. However, if an appliance is removed that carries live sessions, the sessions need to be removed from the entire chain of service routers. Also, when an appliance fails, this failure may be treated identically to removing an appliance from the server set.

Figure 5A:
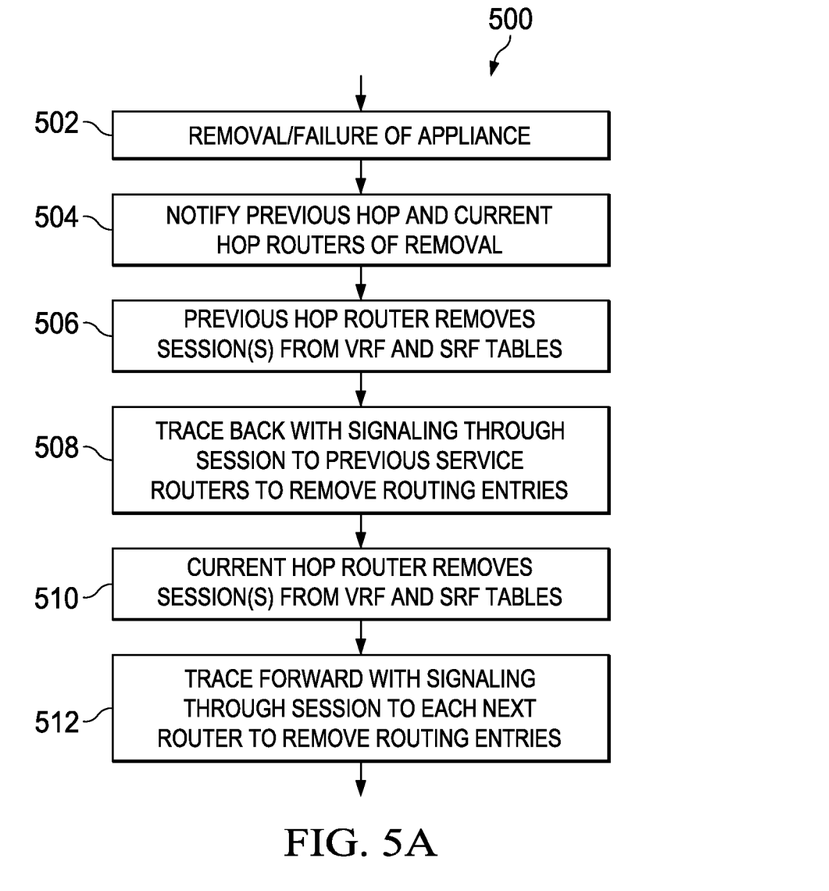
FIG. 5A is a flow diagram illustrating operations that may be associated with removal/failure of an appliance in a service chain in accordance with an example embodiment.

Referring now to FIG. 5A therein is a flow diagram 500 illustrating operations that may be associated with the removal or failure of an appliance in a service chain in accordance with an example embodiment. At 502 the removal or failure of an appliance is detected. At 504 the previous hop and current hop routers are notified of the removal/failure. At 506 the previous hop router removes the session entries from its VRF and SRF session tables and at 508 explicit signaling is used to trace back through the previous service routers of the session to remove session routing entries from each of the previous service routers. At 510 the current hop router removes the session entries from its VRF and SRF tables and at 512 explicit signaling is used to trace forward through the each next hop router of the session to remove session routing entries from each of the next hop routers.

Figure 5B:
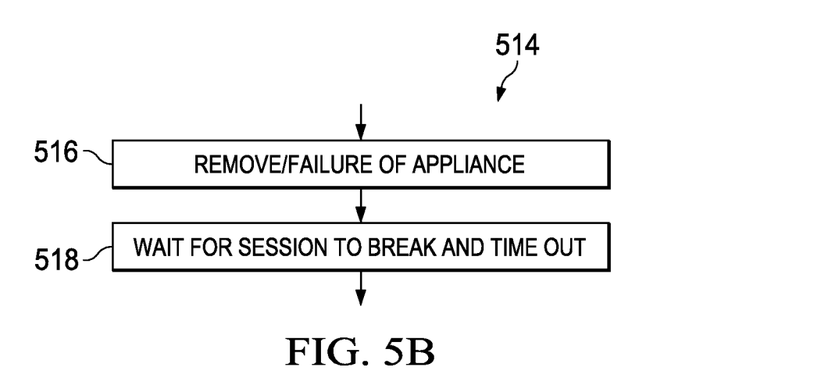
FIG. 5B is a flow diagram illustrating operations that may be associated with removal/failure of an appliance in a service chain in accordance with a further example embodiment.
Figure 6A:
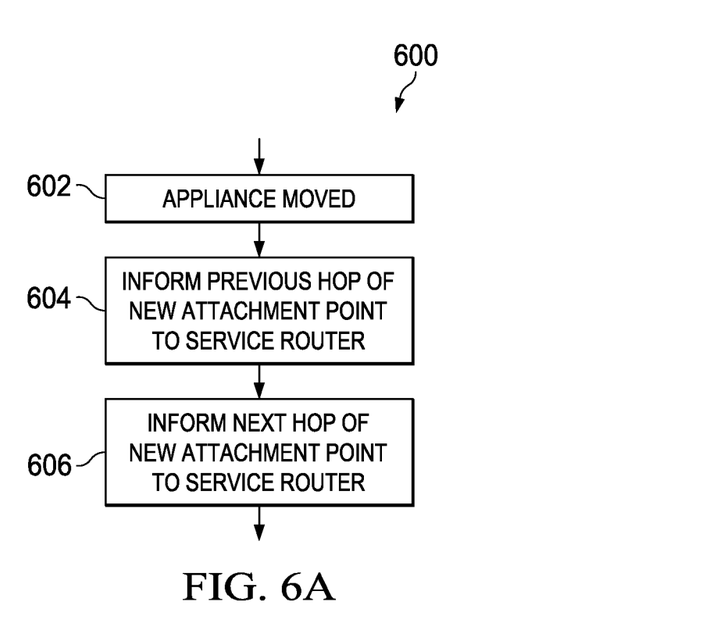
FIG. 6A is a flow diagram illustrating operations that may be associated with a moved appliance in a service chain in accordance with an example embodiment.

FIG. 5B s a flow diagram 514 illustrating operations that may be associated with removal/failure of an appliance in a service chain in accordance with an alternate example embodiment. At 516 the removal or failure of an appliance is detected. At 518 the system waits for the session to break and time out when the session entries will be removed Moving appliances is only a consideration for ongoing sessions that are managed by the moved appliance. Referring to FIG. 6A, therein is a flow diagram illustrating operations that may be associated with a moved appliance in a service chain in accordance with an example embodiment of the disclosure. In this case explicit signaling may be used to update the VRF and SRF session tables. At 602, the appliance is moved. At 604, the previous hop is informed of the appliances new attachment point to a service router. The previous hope may then update the forwarding information of the appropriate sessions. At 606, the next hop is also informed of the appliances new attachment point to a service router. The next hop may then update the forwarding information of the appropriate sessions.

Figure 6B:
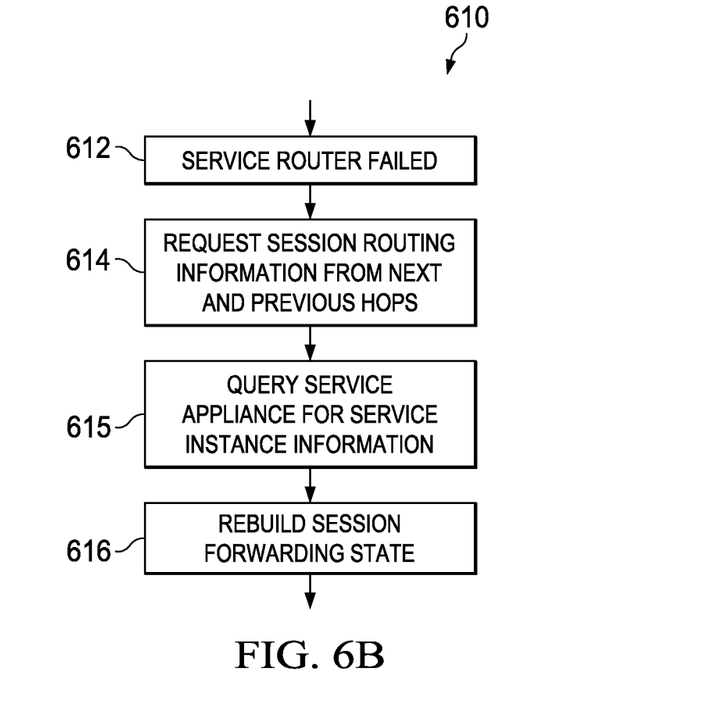
FIG. 6B is a flow diagram illustrating operations that may be associated with service router failure in a service chain in accordance with an example embodiment.

Referring now to FIG. 6B, therein is a flow diagram 610 illustrating operations that may be associated with service router failure in a service chain in accordance with an example embodiment of the disclosure. At 612 a service router fails. At 614 the forwarding state towards that service router is requested by requesting the session routing information from the next and previous hop. At 615 the service appliances are queried for service instance information on which sessions were routed to which service instances. At 616 the session forwarding state is rebuilt.

In terms of the infrastructure of the present disclosure, the routers, processor cores, server blades, service elements, as well as any node, host, or server are network elements (that are synonymous with 'apparatuses' and 'nodes') that can facilitate the network communication activities discussed herein. As used herein in this Specification, the term 'network element' is a broad term meant to encompass routers, switches, cable boxes, gateways, bridges, loadbalancers, cellular and WiMAX access concentrators, firewalls, inline service nodes, proxies, servers, processors, modules, endpoints, user equipment, handheld devices of any kind, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, routers, processor cores, server blades, service elements, etc. include software to achieve (or to foster) the network communication activities discussed herein. This could include, for example, the implementation of instances of implicit session routing firmware and software 310, etc., as shown in FIG. 3, where these modules interact, perform reciprocating functions, and/or suitably coordinate their activities with peers across the network.

For example, instances of implicit session routing firmware and software 310 may be provisioned in a router, in a server, etc. Additionally, each of these elements can have an internal structure (e.g., a processor, a memory element, etc.) to facilitate any of the operations described herein. In other embodiments, these network communication activities may be executed externally to these elements, or included in some other network element to achieve the intended functionality. Alternatively, any of the aforementioned network elements may include software (or reciprocating software) that can coordinate with other network elements in order to achieve the network communication activities described herein. In still other embodiments, one or several devices (e.g., servers) may include any suitable algorithms, hardware, software, components, modules, interfaces, or objects that facilitate the operations discussed herein with respect to implicit session routing activities, etc.

Furthermore, the network element embodiments may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These nodes may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in a communication network could be provided in any database, register, table, cache, queue, control list, or storage structure, based on particular needs and implementations, all of which could be referenced in any suitable timeframe. Any of the memory items discussed herein should be construed as being encompassed within the broad term 'memory' or 'memory element.' Similarly, any of the potential processing elements, modules, and machines described in this Specification should be construed as being encompassed within the broad term 'processor.'

It is also important to note that the operations described with reference to the preceding FIGURES illustrate only some of the possible scenarios that may be executed by, or within, the system. Some of these operations may be deleted or removed where appropriate, or may be changed, modified or changed considerably without departing from the scope of the discussed concepts. In addition, the timing of these operations relative to one another may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

Although the present disclosure has been described in detail with reference to particular arrangements and configurations, these example configurations and arrangements may be changed significantly without departing from the scope of the present disclosure. Moreover, although the communication network has been illustrated with reference to particular elements and operations that facilitate the communication process, these elements, and operations may be replaced by any suitable architecture or process that achieves the intended functionality of the communication network.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, by a service router, a packet of a session from a previous hop router at a service zone of a service chain, wherein the packet comprises a first packet of the session, the service chain comprises a plurality of service zones each having a plurality of service routers, and ones of the plurality of service zones store session entries comprising previous hop and next hop information for the session independently from others of the plurality of service zones;
   recording, by the service router, the previous hop router for the session in a session entry within a routing table of the service router;
   determining, by the service router, an appliance to service the packet in the service zone using load balancing;
   recording, by the service router, an appliance identity for servicing the session in the service zone, wherein the appliance identity identifies the appliance;
   transmitting the packet from the service router to the appliance based on the appliance identity;
   receiving, by the service router, a serviced packet from the appliance, wherein the appliance has serviced the packet by applying a function to the contents of the packet to generate the serviced packet;
   determining, by the service router, a next hop router in the service chain for the packet using load balancing;
   recording, by the service router, the next hop router for the session in another session entry within the routing table of the service router, wherein the next hop router is located at another service zone; and
   routing the serviced packet from the service router to the next hop router located at the another service zone, wherein subsequent packets of the session received in the service zone are transmitted to the appliance for service and serviced packets corresponding to the subsequent packets are routed to the next hop router, wherein the ones of the plurality of service routers in each of the plurality of service zones determine routing decisions based on the session entries independently stored at each of the plurality of service zones and without requiring explicit signalling between the plurality of service zones, and wherein at least one service router in each of the plurality of service zones is operable to perform the method as the first packet is routed through the service chain.

2. The method of claim 1, wherein the serviced packets corresponding to the subsequent packets are received from the appliance.

3. The method of claim 1, wherein the load balancing for determining the appliance and for determining the next hop router comprises applying an equal cost multi-path load balancing function.

4. The method of claim 1, wherein the receiving the packet of the session comprises receiving the packet of the session from a first routing function at a second routing function and the recording the previous hop comprises recording the first routing function as the previous hop for the session in the service chain at the second routing function.

5. The method of claim 4, wherein the determining the appliance comprises determining, in a service routing function, the appliance to service the packet and the recording the appliance identity comprises recording the appliance identity in the service routing function.

6. The method of claim 5, wherein the determining the next hop router comprises determining in the second routing function a third routing function as the next hop for the session in the service chain and recording the next hop router comprises recording the third routing function in the second routing function.

7. The method of claim 1, wherein the method is implemented in the plurality of service routers in the service chain, and wherein the packet is received at a current hop router and the method further comprises:
   detecting that the appliance no longer services the session;
   removing session entries of the current hop router;
   tracing back though the session to remove session entries of previous hop routers; and
   tracing forward through the session to remove session entries of next hop routers.

8. The method of claim 1, further comprising:
   detecting that the appliance has moved to a new attachment point to the service router;
   informing the previous hop router of the new attachment point to the service router; and informing the next hop router of the new attachment point to the service router.

9. The method of claim 1, wherein the packet is received at a current hop router and the method further comprises:
   detecting that the current hop router has failed;
   requesting session routing information from the next hop router and the previous hop router;
   requesting service instance information from at least one service appliance; and
   rebuilding the session forwarding state.

10. A service router, comprising:
    one or more processors; and
    memory, including instructions which when executed by the one or more processors causes the service router to:
      receive a packet of a session from a previous hop router at a service zone of a service chain, wherein the packet comprises a first packet of the session, the service chain comprises a plurality of service zones each having a plurality of service routers, and ones of the plurality of service zones store session entries comprising previous hop and next hop information for the session independently from others of the plurality of service zones;
      record the previous hop router for the session in a session entry within a routing table of the service router;
      determine an appliance to service the packet in the service zone using load balancing;
      record appliance identity for servicing the session in the service zone, wherein the appliance identity identifies the appliance;
      transmit the packet to the appliance based on the appliance identity;
      receive a serviced packet from the appliance, wherein the appliance has serviced the packet by applying a function to the contents of the packet to generate the serviced packet;
      determine a next hop router in the service chain for the packet using load balancing;
      record the next hop router for the session in another session entry within the routing table of the service router, wherein the next hop router is located at another service zone; and
      route the serviced packet from the service router to the next hop router located at the another service zone, wherein subsequent packets of the session received in the service zone are transmitted to the appliance for service and serviced packets corresponding to the subsequent packets are routed to the next hop router, wherein the ones of the plurality of service routers in each of the plurality of service zones determine routing decisions based on the session entries independently stored at each of the plurality of service zones and without requiring explicit signalling between the plurality of service zones, and wherein at least one service router in each of the plurality of service zones is operable to execute an instance of the instructions as the first packet is routed through the service chain.

11. The service router of claim 10, wherein the one or more processors cause the service router to receive, from the appliance, the serviced packets corresponding to the subsequent packets.

12. The service router of claim 10, wherein the one or more processors are configured to provide a virtual routing function that causes the service router to receive the packet of the session and the record the previous hop for the session in the service chain.

13. The service router of claim 12, wherein the one or more processors are configured to provide a service routing function that causes the service router to determine the appliance to service the packet and to record the appliance identity for servicing the session.

14. The service router of claim 10, wherein the load balancing to determine an appliance and to determine the next hop router comprises applying an equal cost multi-path load balancing function.

15. The service router of claim 10, wherein the one or more processors are configured to provide a first virtual routing function that causes the service router to receive the packet of the session from a second virtual routing function and record the second virtual routing function as the previous hop for the session in the service chain.

16. One or more non-transitory tangible media that includes code for execution and when executed by a processor is operable to perform operations comprising:
    receiving, by a service router, a packet of a session from a previous hop router at a service zone of a service chain, wherein the packet comprises a first packet of the session, the service chain comprises a plurality of service zones each having a plurality of service routers, and ones of the plurality of service zones store session entries comprising previous hop and next hop information for the session independently from others of the plurality of service zones;
    recording, by the service router, the previous hop router for the session in a session entry within a routing table of the service router;
    determining, by the service router, an appliance to service the packet in the service zone using load balancing;
    recording, by the service router, an appliance identity for servicing the session in the service zone, wherein the appliance identity identifies the appliance;
    transmitting the packet from the service router to the appliance based on the appliance identity;
    receiving, by the service router, a serviced packet from the appliance, wherein the appliance has serviced the packet by applying a function to the contents of the packet to generate the serviced packet;
    determining, by the service router, a next hop router in the service chain for the packet using load balancing;
    recording, by the service router, the next hop router for the session in another session entry within the routing table of the service router, wherein the next hop router is located at another service zone; and
    routing the serviced packet from the service router to the next hop router located at the another service zone, wherein subsequent packets of the session received in the service zone are transmitted to the appliance for service and serviced packets corresponding to the subsequent packets are routed to the next hop router, wherein the ones of the plurality of service routers in each of the plurality of service zones determine routing decisions based on the session entries independently stored at each of the plurality of service zones and without requiring explicit signalling between the plurality of service zones, and wherein at least one service router in each of the plurality of service zones is operable to execute an instance of the code as the first packet is routed through the service chain.

17. The one or more non-transitory tangible media of claim 16, wherein the operations further comprise receiving, from the appliance, the serviced packets corresponding to the subsequent packets.

18. The one or more non-transitory tangible media of claim 16, wherein the operations further comprise providing a virtual routing function to receive the packet of the session and to record the previous hop for the session in the service chain.

19. The one or more non-transitory tangible media of claim 18, wherein the operations further comprise providing a service routing function for the determining the appliance to service the packet and for the recording the appliance identity for servicing the session.

* * * * *